US009512802B2

(12) United States Patent
Gueguen et al.

(10) Patent No.: US 9,512,802 B2
(45) Date of Patent: Dec. 6, 2016

(54) METHOD FOR OPERATING AN INTERNAL COMBUSTION ENGINE

(71) Applicant: Robert Bosch GmbH, Stuttgart (DE)

(72) Inventors: Nicolas Gueguen, Paris (FR); Klaus Joos, Walheim (DE); Werner Hess, Stuttgart (DE); Holger Rapp, Ditzingen (DE); Haris Hamedovic, Moeglingen (DE); Joerg Koenig, Stuttgart (DE); Harry Friedmann, Vaihingen (DE); Andreas Koch, Loechgau (DE); Ruben Schlueter, Yokohama (JP); Joao Lopes Rauck, Tamm (DE); Christian Reschke, Leonberg (DE); Stephanie Wirth, Malmsheim (DE)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 14/374,235

(22) PCT Filed: Jan. 9, 2013

(86) PCT No.: PCT/EP2013/050253
§ 371 (c)(1),
(2) Date: Jul. 24, 2014

(87) PCT Pub. No.: WO2013/110498
PCT Pub. Date: Aug. 1, 2013

(65) Prior Publication Data
US 2014/0343826 A1 Nov. 20, 2014

(30) Foreign Application Priority Data

Jan. 25, 2012 (DE) .................. 10 2012 201 083

(51) Int. Cl.
F02D 41/30 (2006.01)
F02D 41/24 (2006.01)
F02D 41/40 (2006.01)

(52) U.S. Cl.
CPC ........... *F02D 41/30* (2013.01); *F02D 41/2438* (2013.01); *F02D 41/2467* (2013.01);
(Continued)

(58) Field of Classification Search
CPC .. F02D 41/24; F02D 41/2438; F02D 41/2467; F02D 41/247; F02D 41/30; F02D 41/3035; F02D 41/3064; F02D 41/3076; F02D 41/40; F02D 41/402; Y02T 10/44
(Continued)

(56) References Cited

U.S. PATENT DOCUMENTS 5,131,371 A     7/1992   Wahl et al.
6,053,150 A *   4/2000   Takahashi ........... F02D 41/2438
                                                          123/300

(Continued)

FOREIGN PATENT DOCUMENTS

CN      1991150 A    7/2007
CN    101377169 A    3/2009
(Continued)

OTHER PUBLICATIONS

International Search Report, PCT International Application No. PCT/EP2013/050253, dated Jun. 24, 2013.

*Primary Examiner* — John Kwon
*Assistant Examiner* — Johnny H Hoang
(74) *Attorney, Agent, or Firm* — Norton Rose Fulbright US LLP; Gerard Messina

(57) ABSTRACT

A method for operating an internal combustion engine having two or more cylinders to which fuel can be supplied via an injection valve, it being possible to carry out a measurement injection for a cylinder in order to determine and/or adapt a characteristic quantity of the injection valve, and all the cylinders being ignited in the course of an ignition cycle. To improve the operating characteristics, a measurement injection is carried out for those cylinders that are contained in a specifiable selected set selected from all the cylinders.

9 Claims, 2 Drawing Sheets

(52) U.S. Cl.
CPC .......... *F02D 41/402* (2013.01); *F02D 41/247* (2013.01); *Y02T 10/44* (2013.01)

(58) Field of Classification Search
USPC ......... 701/103–105, 110; 123/295, 299, 300, 123/305, 435
See application file for complete search history.

(56) References Cited

U.S. PATENT DOCUMENTS

| | | |
|---|---|---|
| 6,910,458 B2 | 6/2005 | Oki |
| 7,219,005 B2* | 5/2007 | Mazet ................. F02D 41/20 123/299 |
| 7,845,343 B2* | 12/2010 | Imai ................. F02D 41/1497 123/198 F |
| 7,881,857 B2 | 2/2011 | Samenfink et al. |
| 7,980,120 B2* | 7/2011 | Cinpinski ............. F02D 41/221 701/114 |
| 2003/0111043 A1* | 6/2003 | Rodier ................. F02D 41/008 123/299 |
| 2005/0092303 A1 | 5/2005 | Oki |
| 2007/0144480 A1* | 6/2007 | Herweg ............. F02D 41/3035 123/295 |
| 2008/0308065 A1 | 12/2008 | Imai |
| 2012/0041666 A1 | 2/2012 | Kemmer et al. |

FOREIGN PATENT DOCUMENTS

| | | |
|---|---|---|
| CN | 101413447 A | 4/2009 |
| CN | 101435374 A | 5/2009 |
| DE | 10 2004 052 427 | 6/2005 |
| DE | 10 2005 051 701 | 5/2007 |
| DE | 10 2008 006 327 | 7/2009 |
| EP | 2 003 317 | 12/2008 |

\* cited by examiner

| | | | | | |
|---|---|---|---|---|---|
| 10 | A | B | C | D | E |

| | | | | | |
|---|---|---|---|---|---|
| 10 | A | B | C | D | E |

| | | | | | |
|---|---|---|---|---|---|
| 10 | A | B | C | D | E |

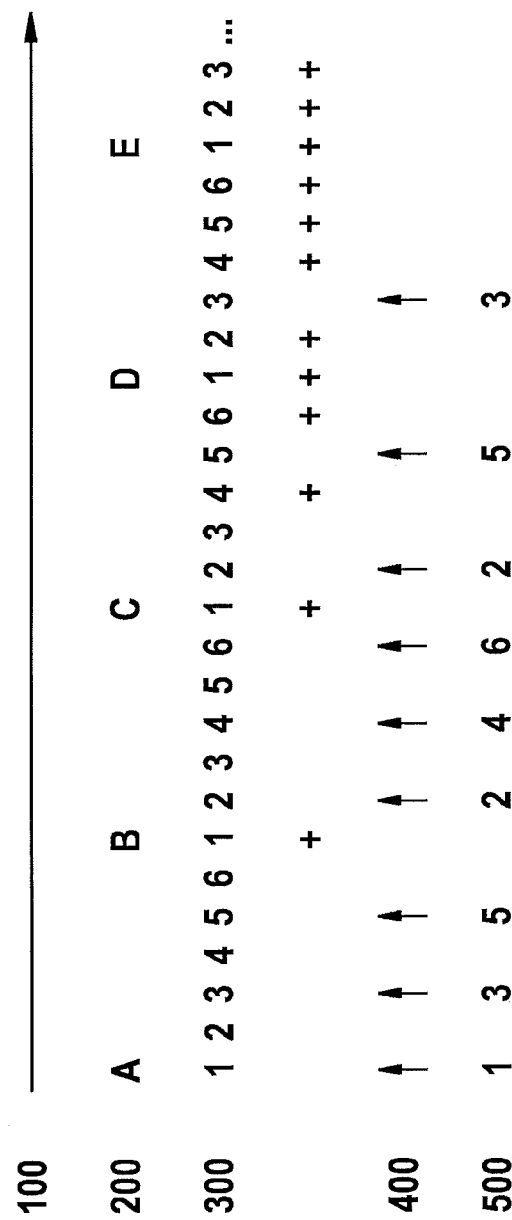

METHOD FOR OPERATING AN INTERNAL COMBUSTION ENGINE

FIELD

The present invention relates to a method for operating an internal combustion engine having two or more cylinders to which fuel can be supplied via an injection valve, it being possible to carry out a measurement injection for a cylinder in order to determine or adapt a characteristic quantity of the injection valve. The present invention also relates to a control and/or regulating device for controlling injection valves of an internal combustion engine having two or more cylinders.

BACKGROUND

In order to operate internal combustion engines having at least two cylinders, the necessary injection of fuel can be made into an intake manifold assigned to the respective cylinder (intake manifold injection), or directly into a combustion chamber of the respective cylinder (direct injection). The injection is carried out regularly using an injection valve. Here, the opening duration of the injection valve correlates with the quantity of fuel injected. The relation between quantity of fuel injected and duration of opening of the injection valve can be reproduced by a valve characteristic curve that is valid for example for a particular fuel pressure at the injection valve. However, a valve characteristic curve can also depict the relation between quantity of fuel injected and some other control quantity of the injection valve (e.g., duration of an applied opening voltage).

To this extent, the quantity of fuel that is to be supplied or injected to the cylinder is in principle controllable via the opening duration, or the other control quantity, of the injection valve. Here, however, it is problematic that injection valves regularly have different properties depending on the particular, individual valve. These result for example from manufacturing tolerances. To keep the valve characteristic curve of an injection valve largely free of such individual variations means in most cases a high manufacturing outlay and therefore high production costs. For this reason, the valve characteristic curves of standardly used injection valves regularly show different curves for different individual units. In particular, there often occurs a deviation from a linear relation (assumed to be ideal) between the injection quantity and the duration of opening.

If the internal combustion engine is operated without measures for compensating the individual unit-dependent deviations of the various injection valves, this can result in an injection of different quantities of fuel into the different cylinders that are ignited one after the other. This can have a disadvantageous effect on smooth running, on the temporal course of the torque, wear characteristics, or exhaust gas emissions of the internal combustion engine.

German Patent Application No. DE 10 2005 051 701 A1 describes a method for operating an internal combustion engine in which the characteristic curve of the injection valve is adapted; i.e., deviations of the actual injected quantity from the target injected quantity are acquired and compensated. For this purpose, the overall injection is divided into a measurement injection and a basis injection, and the measurement injection is used to determine the deviation between the target and actual injected quantity. Here, the named deviation is detected in particular via a deviation of a lambda probe signal in the exhaust gas from a determined target value.

In such a procedure for correcting deviations between the valve characteristic curves of different injection valves, the problem can arise that the respective cylinder is operated with a non-optimal mixture due to the measurement injection. This occurs in particular when the assigned measurement injection takes place in an operating state of the injection valve in which there occurs a large deviation of the actual and target value of the injected quantity, i.e., a large deviation of the individual-dependent valve characteristic curve from a standard characteristic curve or from an assumed ideal characteristic curve. In this region, the measurement injection therefore cannot take place in a "mix-neutral" fashion, i.e., the fuel mixture ignited in the respective cylinder is modified by the measurement injection itself. This effect can occur in particular in an operating range having very short control durations of the injection valve (i.e., short opening duration), because in the case of small injected quantities the individual-dependent deviations of target and actual value of the injected quantity result in particularly large relative errors in the mix composition.

Therefore, the execution of a measurement injection regularly itself causes mix errors. Thus, the described procedure can have the result that some or all cylinders of an internal combustion engine are operated with a non-optimal mix, which in turn can result in an impairment of smooth running, fluctuations in torque, or worsening of the emission/wear properties.

SUMMARY

An object of the present invention is to enable a testing and correction of the injection characteristic of an injection valve of an internal combustion engine having improved operating characteristics of the internal combustion engine (e.g., with regard to smooth running and torque curve). In particular, a disadvantageous influencing of the operating characteristics of the internal combustion engine is to be largely avoided.

This object may be achieved by an example method in accordance with the present invention. This method may be used for the operation of an internal combustion engine having two or more cylinders to which fuel can be supplied via an injection valve. The supply of fuel can here take place through injection into an intake manifold assigned to the respective cylinder, or into a combustion chamber of the respective cylinder. In order to determine and/or to adapt a characteristic quantity of the injection valve, a measurement injection can be carried out for the respective cylinder. In this way, as explained above, as a characteristic quantity in particular the deviation of the target and actual value of the injected quantity can be determined for the respective valve in a respective operating state of the internal combustion engine. Thus, a valve characteristic curve that is been adapted, i.e., corrected relative to a standard or assumed ideal characteristic curve, or a segment of a valve characteristic curve, can also be determined as "characteristic quantity." Here, a value of a determined "actual characteristic quantity" forms in each case a support point of the valve characteristic curve. The determined characteristic quantity can for example be supplied to a control and/or regulating device that in particular controls the respective injection valve and causes an adaptation of the characteristic quantity of the valve. In the sense of the method, an injection valve is to be understood as any device that is suitable for the direct or indirect supply of fuel to a combustion chamber of a cylinder of an internal combustion engine. These include for example injection valves fashioned as magnetic valves.

However, other injectors, for example piezoinjectors, may also be used. In this case, the above-named valve characteristic curve illustrates a relation between a control quantity (for example duration of an injection voltage or of the charge of the piezoactuator) and the injected quantity of fuel.

In the example method according to the present invention, measurement injections during an ignition are carried out only for the cylinders contained in a selected set. For this reason, possible mix errors caused by the measurement injection occur only in the cylinders of the selected set. The rest of the cylinders are operated in the ignition cycle with a mix that is not impaired by the measurement injection. Therefore, operating characteristics with regard to smooth running, torque curve, emission, and wear of the internal combustion engine can be improved.

The larger the number of the cylinders in the selected set chosen from all the cylinders, the shorter is the duration of measurement required for the measurement of all cylinders, i.e., for the determination/adaptation of the characteristic quantities of all injection valves of the cylinders. On the other hand, the influencing of the operating characteristics of the internal combustion engine through the measurement injection is less the smaller the number of selected cylinders is. Therefore, a suitable determination of the selected set permits an optimal compensation between a measurement duration that is as short as possible and operating characteristics that are as advantageous as possible. However, the selected set is not necessarily to be understood as a proper subset of all the cylinders, but rather can also include all the cylinders. This can be advantageous if priority is placed on a particularly rapid measuring of all cylinders.

The example method according to the present invention enables the compensation of manufacturing tolerances of injection valves in an internal combustion engine. Less strict requirements need be made on the individual-dependent deviations of different injection valves. This contributes to a reduction of costs.

Advantageous embodiments of this example method result in that the selected set is determined as a function of an operating parameter of the internal combustion engine. This operating parameter may be, for example, the fuel mass requirement, the load or rotational speed of the internal combustion engine, or an injection pressure of the fuel or ignition angle, or ignition time, for a periodically operating cylinder. In this way, it can be taken into account that the mix errors caused by a measurement injection make themselves particularly noticeable when there is a small overall supply of fuel, because then the relative change in the mix composition is particularly large. This case occurs for example at low engine load or in no-load operation of the internal combustion engine.

It can also be advantageous to determine the selected set as a function of an environmental parameter, in particular as a function of the external temperature of the internal combustion engine. In this way, it can be taken into account that an internal combustion engine can have, at particular values of an environmental parameter, disadvantageous or undesirable operating characteristics. This is conceivable for example during warm-up or during operation with a late ignition angle. Here, a disadvantageous influencing by the measurement injection can make itself particularly noticeable because this can cause an additional lack of smoothness in running. These effects can be significantly reduced by selecting a smaller number of cylinders for a measurement injection.

An environmental parameter can be the same at the temperature in the surrounding environment of the internal combustion engine (environmental temperature) and the influence thereof on the temperature of the internal combustion engine after starting: after an engine start at low temperatures, an internal combustion engine typically has an increased lack of smoothness in running (e.g., due to worse mixture formation and/or increased friction). As the internal combustion engine warms up, the smooth running improves. Thus, the influencing quantity designated as environmental parameter is not directly the external temperature of the internal combustion engine.

An example embodiment of the method according to the present invention is particularly advantageous in that the preceding ignition cycle is followed by a further ignition cycle, a first selected set being determined for the preceding ignition cycle and a further selected set being determined for the further ignition cycle, the further selected set including a subset of all the cylinders differing from the first selected set. In this way, in the course of a plurality of successive ignition cycles gradually all the cylinders of the internal combustion engine are measured.

According to an advantageous embodiment of the example method, the cylinders are ignited one after the other in an ignition sequence, a measurement injection taking place for those cylinders that follow at the nth position after the respectively preceding cylinder in the ignition sequence for which a measurement injection has taken place. Here, depending on the desired operating state, n is selected to be a specifiable whole number greater than zero. For a particular arbitrarily selected ignition cycle, the assigned selected set then includes just those cylinders that fulfill the above-named condition and that are to be ignited in the selected ignition cycle.

This enables a systematic and reliable determination of the respective selected set. Given a known total number of cylinders of the internal combustion engine, through a suitable selection of the number n it can therefore be ensured that, at least after repeated running through of successive ignition cycles, a measurement injection has been carried out for all cylinders.

The number n can be chosen to be large if an influencing of the operation of the internal combustion engine by measurement injections is to be reduced. On the other hand, the selection of a small number n can achieve a rapid measurement of all cylinders on the basis of measurement injections.

An advantageous determination of the selected set can also take place in that the cylinders are continuously ignited one after the other in an ignition sequence, and that the selected set includes every nth cylinder in the ignition sequence, where n is a specifiable whole number greater than zero.

Particularly advantageous is an example embodiment of the method in which for the determination of the selected set of a particular ignition cycle, a cylinder is not taken into account for which a number of measurement injections has already taken place that is judged to be sufficient on the basis of a specifiable measurement criterion. This takes into account the circumstance that for the correction of larger deviations from a target value, as a rule a larger number of measurements is required, or that due to unfavorable operating characteristics individual measurements cannot be evaluated. A measurement criterion can for example be a particular maximum deviation of the target and actual value. The indicated measure avoids the carrying out of unnecessary measurement injections. With regard to the above-explained method for determining the selected set, this means that a cylinder for which a sufficient number of measurements was already carried out is skipped in the determination of the cylinder at the nth position in the ignition sequence from the preceding cylinder operated with a measurement injection.

Moreover, for the example method it may be advantageous if the determined characteristic quantity is stored in a storage device. In this way, in step-by-step fashion a plurality of support points can be determined of a real valve characteristic curve of the injection valve, this curve being available for the further operation of the internal combustion engine for a controlling of the injection valves.

The example method can be further improved in that the determination of the characteristic quantity of the injection valve takes place for a particular boundary condition that is also acquired. The boundary condition characterizes in particular an operating parameter or environmental parameter of the internal combustion engine. For this purpose, the corresponding operating parameter or environmental parameter is determined and is assigned to the characteristic quantity. In particular, the characteristic quantity and the boundary condition can be stored together, for example in a storage device for a control/regulating device that controls the injection valves. In this way a number of different characteristic quantities, or valve characteristic curves, can be determined for various boundary conditions that can be used for an optimal controlling of the internal combustion engine under the respective boundary conditions.

Advantageously, a measurement series is carried out with so many successive ignition cycles until for each cylinder a number of measurement injections has been carried out that is judged to be sufficient on the basis of a predeterminable measurement criterion. In particular, here it is advantageous if for each determined and acquired boundary condition a measurement series is carried out, and the respective characteristic quantities and assigned boundary conditions are stored together.

It makes sense if, after running through a measurement series, a further measurement series is run through, the first selected set of the first ignition cycle of the further measurement series including first those cylinders for which particularly large deviations of the characteristic curve from a target value were determined. In this way, during operation of the internal combustion engine in each case the characteristic quantities are first corrected for those injection valves for which, on the basis of the preceding measurements, the largest deviations of target and actual value are to be expected. This makes it possible to keep the number of measurement injections for measuring all injection valves as low as possible. The further measurement series can for example be run through for a different value of an operating parameter or environmental parameter, in order to gradually achieve in this way a complete characterization of the respective injection valve. Here it is possible that a carrying out of measurement injections for the further operation of the internal combustion engine is prevented when a sufficient characterization has been obtained of the injection valves of all the cylinders. In this case, it is advantageous if each measurement series, as explained, is kept as short as possible, in order to avoid as far as possible an impairment of the fuel mixture by the measurement injections.

The object is also achieved by a control device and/or regulating device by which the injection valves of an internal combustion engine can be controlled in accordance with the example method explained above.

Further details and embodiments of the present invention can be learned from the description below, on the basis of which the specific embodiments shown in the Figures are described and explained in more detail.

BRIEF DESCRIPTION OF THE DRAWINGS

FIGS. 1 through 3 show schematic representations of various specific embodiments of an example method according to the present invention.

FIG. 4 shows a further specific embodiment of a method according to the present invention.

DETAILED DESCRIPTION OF EXAMPLE EMBODIMENTS

On the basis of FIGS. 1 through 3, examples are explained of procedures for determining selected sets from the cylinders of an internal combustion engine, for which a measurement injection is to take place during the carrying out of the example method according to the present invention. For this purpose, an internal combustion engine (not shown) having three cylinders is assumed, designated by the numbers 1 through 3 in FIGS. 1 through 3.

During operation of the internal combustion engine, all the cylinders 1 through 3 are ignited in the course of an ignition cycle. For continuous operation of the internal combustion engine, ignition cycles succeed one another continuously, indicated in FIGS. 1 through 3 in each case by the symbols A, B, C, D, E, in succession, in the line designated with reference character 10. Within each ignition cycle 10, the cylinders are ignited one after the other in the sequence 1, 2, 3, so that there results the ignition sequence shown in line 20, moving from left to right.

In the example of FIG. 1, the selected set of all the cylinders 1 through 3 is formed for each of the ignition cycles A through E. Thus, in the example shown in FIG. 1, a measurement injection takes place for each cylinder in the ignition sequence, which is indicated in line 30 by a respective arrow symbol under the respective cylinder. The selected set formed in this way is shown for each of the ignition cycles A through E in line 40 of FIG. 1, and here includes all the cylinders in their ignition sequence.

FIG. 2 in turn also shows in line 10 the successive ignition cycles A through E, in line 20 the ignition sequence of cylinders 1 through 3, in line 30 arrow symbols for indicating a measurement injection for the respective cylinder in the ignition sequence, and in line 40 the associated selected set for each ignition cycle. In the example of FIG. 2, the selected sets for ignition cycles 10 are determined in that a measurement injection is carried out for each second cylinder in the ignition sequence. For a particular ignition cycle 10, the assigned selected set thus includes those cylinders that, in the ignition sequence 20, each follow at the second position from a cylinder for which a previous measurement injection takes place, and which are ignited in the selected ignition cycle.

As can be seen from line 40 of FIG. 2, the selected set for ignition cycle A includes cylinders 1 and 3, and the selected set for ignition cycle B includes cylinder 2, and the selected set for ignition cycle C again includes cylinders 1 and 3. Thus, the selected set for ignition cycle B differs from the selected set for ignition cycle A. After running through two successive ignition cycles 10, therefore, in the example of FIG. 2 a measurement injection has taken place for each of the cylinders 1 through 3.

In the example of FIG. 3, the selected sets assigned to ignition cycles A through E are determined in that every fourth cylinder in ignition sequence 20 is provided for a measurement injection (reference characters 10, 20, 30, and 40 having the same reference as in FIGS. 1 and 2). A particular selected set 40 assigned to a selected ignition cycle 10 therefore includes those cylinders that follow at the fourth position in ignition sequence 20 from a cylinder for which a measurement injection has taken place (arrow symbol in line 30) and which is ignited in the respective ignition cycle 10. Therefore, the selected set for ignition cycle A contains cylinder 1, the selected set for ignition cycle B contains cylinder 2, the selected set for ignition cycle C contains cylinder 3, and the selected set for ignition cycle D does not contain a cylinder. The selected set for the following ignition cycle E then again contains cylinder 1. Thus, after running through three successive ignition cycles, a measurement injection has taken place for each of the cylinders 1 through 3.

With the aid of FIG. 4, it is illustrated how, using the example method according to the present invention, a measurement series is run through for the characterization of all the cylinders of an internal combustion engine having six cylinders. This measurement series can for example be run through during the operation of the internal combustion engine given the presence of particular operating parameters and environmental parameters (for example, fuel pressure and external temperature), in order to determine for the injection valves of all the cylinders a set of characteristic quantities of the injection valve associated with these operating and environmental parameters.

In the line having reference character 100, a time axis is shown symbolizing progressing time during the operation of the internal combustion engine. The example method relates to the operation of an internal combustion engine having six cylinders (not shown), symbolized by the numbers 1, 2, 3, 4, 5, and 6.

In line 200, temporally successive ignition cycles A, B, C, D, and E are shown. In each of the ignition cycles, all of the cylinders 1 through 6 are ignited in the depicted sequence of their designation. Thus, line 300 of FIG. 4 indicates an ignition sequence of the cylinders of the internal combustion engine in the temporal course of the method.

In order to determine a characteristic quantity of an injection valve (not shown) assigned to the respective cylinder 1 through 6, within each of the ignition cycles (200) there takes place a measurement injection for that cylinder of the ignition sequence (line 300) for which an arrow symbol is entered in line 400. For each of the ignition cycles of line 200, these form a selected set assigned to the respective ignition cycle. The cylinders contained in each selected set are each shown in line 500.

In the case shown in FIG. 4, the selected set assigned to a respective ignition cycle 200, according to line 500, is determined in that a cylinder from the ignition sequence (300) is assigned to the respective selected set if it follows, in ignition sequence 300, at the second position from a preceding cylinder of the ignition sequence for which a measurement injection previously took place.

In order to determine selected sets 500, for ignition cycle A of line 200 one begins with cylinder 1. For this cylinder 1, a measurement injection takes place. Thus, the selected set according to line 500 for ignition cycle A includes cylinders 1, 3, and 5, because each of these follows at the second position in the ignition sequence from a cylinder for which, according to line 400, a measurement injection has taken place in ignition cycle A.

It is now assumed that after running through ignition cycle A, the determination of the characteristic quantity for cylinder 1 has supplied an actual value that lies within a specified tolerance of a target value (for example standard value of the characteristic quantity under consideration for the respective injection valve), and thus a measurement criterion is fulfilled. The fulfillment of the measurement criterion for cylinder 1 is symbolized, for the following ignition cycles B, C, D, and E, in that a plus symbol is shown under line 300 indicating the ignition sequence.

Thus, before running through the following ignition sequence B, the initial situation is present that for cylinder 1 the desired characteristic quantity has been determined with sufficient precision, whereas for cylinders 2 through 6 a measurement having further measurement injections is still required. In the determination of the selected set assigned to ignition cycle B according to line 500, cylinder 1 in the ignition sequence according to line 300 is now not taken into account, because a number of measurement injections judged to be sufficient has already taken place for cylinder 1. Subsequently, cylinder 1 is no longer taken into account in the determination of the selected sets. Therefore, the second cylinder following cylinder 5 in the ignition sequence in ignition cycle B is not cylinder 1, but rather is cylinder 2. Correspondingly, the selected set for ignition cycle B includes cylinders 2, 4, 6, because in the ignition sequence 300 each of these follows at the second position from a cylinder for which a measurement injection took place according to line 400.

For the rest, it is now assumed that on the basis of the measurement injections in the ignition cycle B a determination that is sufficient in the above sense has taken place of the respective characteristic quantity for cylinders 4 and 6. For the following ignition cycles C, D, and E, this is again represented by a plus symbol under the respective cylinders of injection sequence 300.

For the determination of the selected set assigned to ignition cycle C according to line 200, in ignition sequence 300 cylinders 1, 4, and 6 are therefore not taken into account. Consequently, the selected set for ignition cycle C first includes cylinder 2, because this cylinder follows at the second position in ignition sequence 300 from the last cylinder 6 for which a measurement injection took place. Here the fact that a measurement injection is no longer required for cylinder 1 in ignition cycle C does not play a role. Cylinder 1 is simply not taken into account in the selection of the cylinders contained in the selected set for ignition cycle C, but is counted in ignition sequence 300. As a further cylinder contained in the selected set assigned to ignition cycle C, cylinder 4, following at the second position in the ignition sequence from cylinder 2, would first come under consideration. However, in the determination of the selected set this cylinder is not taken into account for the reason indicated above. Instead, the next cylinder in the ignition sequence to be taken into account, i.e., cylinder 5, is incorporated into the selected set.

It is now assumed that on the basis of the measurement injections in injection cycle C sufficient measurements are now also present for cylinders 2 and 5, which is in turn symbolized for the following ignition cycles by plus symbols under the cylinders of ignition sequence 300. For ignition cycle D, therefore, only cylinder 3 remains for consideration for incorporation into the associated selected set, because further determination of the characteristic quantity by measurement injection is still required only for this cylinder.

In the depicted example, this measurement injection for cylinder 3 in ignition cycle D finally supplies a measurement result that is to be judged sufficient (plus symbol under cylinder 3 in ignition cycle E).

Ignition cycles A, B, C, and D form a measurement series that terminates after the termination of ignition cycle D. If it is for example assumed that during the time of ignition cycles A through D particular operating parameters and/or environmental parameters of the internal combustion engine are present, then after the termination of the measurement series a characterization takes place of all the cylinders/injection valves of the internal combustion engine for the present parameters. The obtained characteristic quantities can then be stored in a control and/or regulating device of the internal combustion engine for controlling the injection valves for the present parameters.

It will be seen that the measurement series formed according to the design explained above will be longer the greater the distance is selected at which the cylinders that are to be incorporated into a respective selected set follow one another in the ignition sequence.

What is claimed is:

1. A method for operating an internal combustion engine having two or more cylinders to which fuel can be supplied via injection valves, the method comprising:
   igniting all cylinders during ignition cycles of the internal combustion engine;
   for each of a plurality of the ignition cycles, performing a measurement injection for only those cylinders that are contained in a set of cylinders selected from all of the cylinders, wherein each set of cylinders for each of the plurality of ignition cycles is selected as a function of at least one of an operating parameter and an environmental parameter, wherein a cylinder is left out of the set if a number of measurement injections has taken place for that cylinder is judged to be sufficient based on a specifiable measurement criterion; and
   adapting a characteristic quantity of the injection valves based on the measurement injections.

2. The method as recited in claim 1, wherein at least one of the following operating parameters of the internal combustion engine is used to determine the selected set: fuel mass requirement, load of the internal combustion engine, rotational speed of the internal combustion engine, injection pressure of the fuel, ignition angle of the ignition.

3. The method as recited in claim 1, wherein a preceding ignition cycle is followed by a further ignition cycle, a first selected set being determined for the preceding ignition cycle and a further selected set being determined for the further ignition cycle, the further selected set differing from the first selected set.

4. The method as recited in claim 1, wherein the cylinders are ignited in an ignition sequence, and ignition sequences with respectively associated selected sets succeed one another continuously, and for each selected ignition cycle the associated selected set includes each cylinder that is both ignited in the selected ignition cycle and follows in the ignition sequence at an nth position from the respectively last preceding cylinder for which a measurement injection has taken place, where n is a specifiable whole number greater than zero.

5. The method as recited in claim 1, wherein in the determination of the selected set, a cylinder, immediately following a cylinder for which a number of measurement injections has taken place that is judged to be sufficient based on a specifiable measurement criterion, is incorporated into the respective selected set.

6. The method as recited in claim 1, wherein for the determining of the characteristic quantity, at least one of a fuel mass requirement, load or rotational speed of the internal combustion engine, injection pressure, ignition angle, and an associated environmental parameter, is acquired and is assigned to the characteristic quantity, and is stored in a storage device.

7. The method as recited in claim 1, wherein a measurement series is run through having successive ignition cycles until for each cylinder a number of measurement injections has taken place that is judged to be sufficient on the basis of a specifiable measurement criterion.

8. The method as recited claim 7, wherein after running through a measurement series a further measurement series is run through, the first selected set of the further measurement series including at least one cylinder for which in each case a largest deviation of the characteristic quantity from a target value was determined.

9. A control or regulating device for controlling injection valves of an internal combustion engine having two or more cylinders, the device configured to ignite all cylinders during ignition cycles of the internal combustion engine, the device configured to perform, for each of a plurality of the ignition cycles, a measurement injection for only those cylinders that are contained in a set of cylinders selected from all of the cylinders, wherein each set of cylinders for each of the plurality of ignition cycles is selected as a function of at least one of an operating parameter and an environmental parameter, wherein a cylinder is left out of the set if a number of measurement injections has taken place for that cylinder is judged to be sufficient based on a specifiable measurement criterion, and wherein the device configured to adapt a characteristic quantity of the injection valves based on the measurement injections.

\* \* \* \* \*